(12) United States Patent
Max et al.

(10) Patent No.: US 12,000,709 B2
(45) Date of Patent: Jun. 4, 2024

(54) METHOD FOR COLLECTION OF TRANSPORTATION VEHICLE-BASED, LOCATION-RELATED DATA RECORDS

(71) Applicants: VOLKSWAGEN AKTIENGESELLSCHAFT, Wolfsburg (DE); AUDI AG, Ingolstadt (DE)

(72) Inventors: Stephan Max, Gifhorn (DE); Edson William Fangwa Nzeya, Ingolstadt (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 16/809,937

(22) Filed: Mar. 5, 2020

(65) Prior Publication Data

US 2020/0292345 A1 Sep. 17, 2020

(30) Foreign Application Priority Data

Mar. 11, 2019 (DE) ..................... 10 2019 001 735.8

(51) Int. Cl.
*G01C 21/34* (2006.01)
*G01C 21/36* (2006.01)
(Continued)

(52) U.S. Cl.
CPC ..... *G01C 21/3492* (2013.01); *G01C 21/3605* (2013.01); *G08G 1/0112* (2013.01);
(Continued)

(58) Field of Classification Search
None
See application file for complete search history.

(56) References Cited

U.S. PATENT DOCUMENTS 9,047,774 B2 6/2015 Tseng et al.
9,818,237 B2 11/2017 Iyoda et al.
(Continued)

FOREIGN PATENT DOCUMENTS

CN 1491384 A 4/2004
CN 101510356 A 8/2009
(Continued)

OTHER PUBLICATIONS

CHEN; Data Acquisition System Based on PLC Free Port Communication and SQL Database; Electrical Engineering; Jun. 25, 2018; No. 12.
(Continued)

*Primary Examiner* — Maceeh Anwari
*Assistant Examiner* — Aarron E Santos
(74) *Attorney, Agent, or Firm* — Barnes & Thornburg LLP

(57) ABSTRACT

A method for collecting transportation vehicle-based data and transferring the data to a backend computer, wherein the respective data sets relate to predefined route sections travelled along by a swarm of data-collecting vehicles, wherein parameterized orders for the acquisition of transportation vehicle-based data are stored in the backend computer and each order includes the parameter of route section, which defines the route section for which transportation vehicle-related data is to be collected; the parameter of swarm size, which defines how many transportation vehicles per unit of time are to collect data for the specified route section; and the parameter time interval, which defines the time interval in which data is to be acquired for the route section. Route-related data is continuously transferred to the backend computer from each transportation vehicle of the swarm, wherein a header constitutes an overview of the transporta-
(Continued)

tion vehicle-based data stored temporarily in the transportation vehicle.

12 Claims, 4 Drawing Sheets

(51) Int. Cl.
  *G08G 1/00* (2006.01)
  *G08G 1/01* (2006.01)
  *H04W 4/40* (2018.01)
(52) U.S. Cl.
  CPC ............. *G08G 1/202* (2013.01); *G08G 1/207* (2013.01); *H04W 4/40* (2018.02)

(56) References Cited

U.S. PATENT DOCUMENTS

| | | | |
|---|---|---|---|
| 9,830,396 | B2 | 11/2017 | Bai et al. |
| 10,424,128 | B2 | 9/2019 | Oberschachtsiek et al. |
| 2014/0115335 | A1 | 4/2014 | Jorden et al. |
| 2014/0179237 | A1* | 6/2014 | Gao et al. ............. H04W 24/10 455/67.11 |
| 2014/0277902 | A1* | 9/2014 | Koch ...................... G07C 5/008 701/29.1 |
| 2015/0088335 | A1 | 3/2015 | Lambert et al. |
| 2015/0161825 | A1 | 6/2015 | Ghoneim et al. |
| 2015/0186548 | A1* | 7/2015 | Chun ...................... H04W 4/90 707/769 |
| 2016/0364921 | A1* | 12/2016 | Iyoda ................... G07C 5/0841 |
| 2017/0330391 | A1 | 11/2017 | Uno |
| 2017/0355382 | A1 | 12/2017 | Wang et al. |
| 2018/0151064 | A1* | 5/2018 | Xu ........................ G08G 1/0116 |
| 2018/0164121 | A1 | 6/2018 | Ichikawa |
| 2018/0283895 | A1 | 10/2018 | Aikin |
| 2019/0011931 | A1* | 1/2019 | Selvam ................... G08G 1/202 |

FOREIGN PATENT DOCUMENTS

| | | | |
|---|---|---|---|
| CN | 102411677 A | 4/2012 | |
| CN | 102881057 A | 1/2013 | |
| CN | 106412117 A | 2/2017 | |
| CN | 107491188 A | 12/2017 | |
| CN | 108139221 A | 6/2018 | |
| DE | 102011106295 A1 | 1/2012 | |
| DE | 102014203993 A1 | 9/2014 | |
| DE | 102015118093 A1 | 5/2016 | |
| DE | 102015219783 B3 | 12/2016 | |
| DE | 102016110794 A1 * | 12/2016 | ............ G07C 5/008 |
| DE | 102016110794 A1 | 12/2016 | |
| DE | 112015005996 T5 | 10/2017 | |
| EP | 2002369 A2 | 12/2008 | |
| JP | 2015179445 A | 10/2015 | |
| WO | 2017050278 A1 | 3/2017 | |

OTHER PUBLICATIONS

Office Action for Chinese Patent Application No. 202010166739.5; Aug. 26, 2021.

* cited by examiner

METHOD FOR COLLECTION OF TRANSPORTATION VEHICLE-BASED, LOCATION-RELATED DATA RECORDS

PRIORITY CLAIM

This patent application claims priority to German Patent Application No. 10 2019 001 735.8, filed 11 Mar. 2019, the disclosure of which is incorporated herein by reference in its entirety.

SUMMARY

Illustrative embodiments relate to a method for collecting transportation vehicle-based data, in particular, environmental data, and transferring it to a backend computer, wherein the respective data sets relate to predefined route sections which are travelled along by a swarm of data-collecting vehicles. Illustrative embodiments further relate to a corresponding device.

BRIEF DESCRIPTION OF THE DRAWINGS

Disclosed embodiments will be explained below with reference to the drawings, in which.

DETAILED DESCRIPTION

Figure 1:
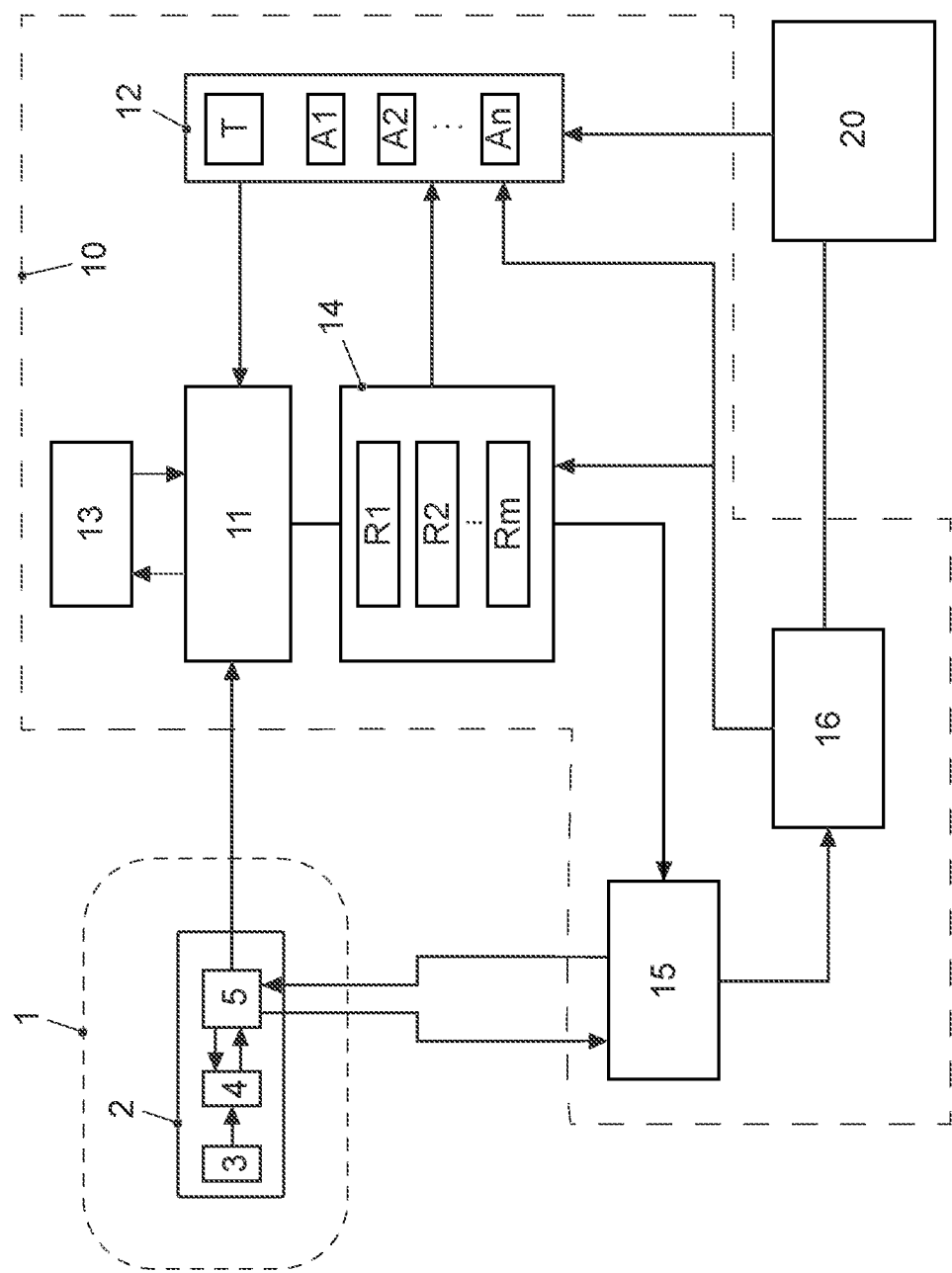
FIG. 1 shows a first embodiment of the method for collecting transportation vehicle-based data by a backend computer.

In the last few years, a variety of interactive electrical series-production systems for assisting drivers have been developed. The integrated assistance and comfort systems use various sensors to sense the surroundings of the transportation vehicle to make the journey safer and more comfortable, and in this way they generate current data about the environment which is currently being travelled through, that is to say the route section which is currently being travelled through.

Since the transportation vehicles are already equipped with various sensor systems, it is appropriate to collect this data and use it in wide ranging ways. This trend is also reinforced by two changed boundary conditions. On the one hand, systems which were previously offered on an optional basis have become part of series-production equipment as result of the continuously increasing safety requirements of, for example, the NCAP (New Car Assessment Programme [or Europäisches Neuwagen-Bewertungs Programm—European New Car Assessment Programme]). On the other hand because the electronic emergency call system, also referred to as eCall, has become compulsory it is legally prescribed to have a mobile radio link in the transportation vehicle. Therefore, the environmental data can be collected and communicated directly in a location-related and synchronized way.

Different data classes are acquired in the transportation vehicle itself. The data is divided up as follows with respect to the environment:

geoinformation which relates to the geographical phenomena which are connected directly and indirectly to a position which is based on the earth, traffic data, that is to say a description of the states of all of the objects involved in the traffic, location-related event data, such as, for example, local hazardous areas arising on a one-off basis, and location-related state data, specifically data which can be acquired continuously, such as, for example, temperature, occupation of parking spaces, state of traffic lights, alternating road signs, etc.

In previous systems the data was simply passed on directly from the transportation vehicle. In this context, data packets were acquired in the transportation vehicle and transmitted in an unchanged form to the backend. Intelligent processing was not performed.

Document DE 10 2014 203 993 A1 describes a system with a processor to make projections of monitoring requirements for a road section. The processor is also configured to make contact with one or more transportation vehicles moving on the road section during a time period of a monitoring requirement. The processor is additionally configured to instruct a first number of transportation vehicles with which contact has been made to perform traffic data monitoring and to produce traffic data reports for the road section, determined on the basis of a projected monitoring requirement.

Document DE 10 2011 106 295 A1 relates to a method for bidirectional data transmission between transportation vehicles and a service provider, with the provision of information data which can be received by the transportation vehicles and originates from the service provider, via a data infrastructure cloud, and provision of traffic data which describes a traffic state and originates from the transportation vehicles. To permit safe bidirectional transmission of the data, there is provision for the traffic data to be provided exclusively to the service provider via a backend server device which is operated by a security operator.

Document DE 11 2015 005 996 T5 describes a system for collecting transportation vehicle data. In this context, a center transfers, to a subject transportation vehicle through wireless communication, a type of transportation vehicle data to be collected, a condition expression which is used during the collection of the transportation vehicle data, a sample cycling during the collection of the transportation vehicle data and/or a checking cycle of the condition expression. A center-end checking section checks, on the basis of its checking criterion, the appropriateness of at least one of the types of the transportation vehicle data, the condition expression, the sampling cycle and the checking cycle. A transportation vehicle-end checking section checks whether the resources of the subject transportation vehicle are appropriate if the transportation vehicle data is collected on the basis of the regulation from the center.

Document DE 10 2015 219 783 B3 relates to a method for controlling acquired data from a multiplicity of transportation vehicles, wherein data is anonymized and a data reduction is provided. The control is present between the units of each transportation vehicle, between the multiplicity of transportation vehicles and a backend of the system, between the units of the backend and also possibly between the units of the backend and at least one external service provider. The data reduction is brought about by avoiding the transmission of redundant data or by avoiding unnecessary data acquisition.

Drawbacks of known solutions are:
relatively high data costs and
relatively low flexibility when there are changed requirements and slow implementation of new functions.

It is assumed that the backend is able to receive data from the transportation vehicle on request. This request is controlled by an order database which describes the data requirements of the transportation vehicles in the swarm.

The disclosed embodiments optimize location-related and time-related control of the collection of transportation vehicle-related data of a swarm of transportation vehicles.

This is achieved by the disclosed method and by the disclosed device.

In the disclosed method for collecting transportation vehicle-based data, in particular environmental data, and transferring it to a backend computer, wherein the respective data sets relate to predefined route sections which are travelled along by a swarm of data-collecting vehicles, parameterized orders for the acquisition of transportation vehicle-based data are stored in the backend computer, wherein each order comprises at least the following parameters:

the parameter of route section, which defines the route section for which transportation vehicle-related data is to be collected, the parameter of swarm size, which defines how many transportation vehicles per unit of time are to collect data for the specified route section, and the parameter of time interval, which defines the time interval in which data is to be acquired for the route section.

Route-related data, such as a header, is thus continuously transferred to the backend computer from each transportation vehicle of the swarm, wherein a header constitutes an overview of the transportation vehicle-based data stored temporarily in the transportation vehicle. A transferred header is compared with the requirements of the orders which are defined by the parameters of the route section, swarm size and time interval, and in the case of a positive comparison, the header is classified as capable of being retrieved, so that the data set which is assigned to the header can be retrieved from the transportation vehicle and fed to further processing method or mechanism.

The definition of the route section can be implemented here by using GPS points which define the start and the end of the route section, wherein the starting points and end points can predefine the direction of travel simultaneously. Furthermore, the route section can be defined by a sequence of GPS points, which would correspond to a trajectory. In addition, the route section or the trajectory can be specified within a digital map.

Headers which are currently not required may be stored for a predefined time period. Headers which are currently not required are compared within the predefined time period with the defined requirements of the orders. In this way, headers which are currently not required can possibly also be evaluated.

The parameter of the time interval of each order may be assigned a repetition frequency with which the order is repeated. In this way, the monitoring interval can be repeated in a predefined state, such as, for example, monitoring of a predefined route section from 9.00 am to 10.00 am, wherein the measurements for the same interval are to be repeated from Monday to Friday.

Optionally, each order comprises the following parameters
already requested data sets and
already received data sets, wherein
these parameters serve to monitor the execution of the orders.

In the case of a retrieval of a header which is capable of being retrieved, the requesting of the retrieval is noted in the parameter of "already requested data sets", and in the case of reception of the requested data set, this is noted in the parameter of "already received data sets". In this way, the respective order is informed about the progress of the processing.

Each header which is capable of being retrieved is stored together with further parameters in a retrieval register, by which the data set associated with the header is retrieved from the respective transportation vehicle. The retrievals can be correspondingly organized by the retrieval register.

In a first disclosed embodiment, each header which is capable of being retrieved may be respectively assigned a retrieval register by which the associated data set is retrieved from the transportation vehicle.

In a second disclosed embodiment, each header which is capable of being retrieved may be respectively assigned a retrieval register, wherein each retrieval register is assigned an order, and a retrieval register has more than one header. In this way, the data sets assigned to the header can as it were be retrieved block by block from the transportation vehicles by a retrieval register.

The data sets which are assigned to the headers of a retrieval register are then retrieved from the corresponding transportation vehicles when the number of headers of a retrieval register reaches a predefined value, wherein the predefined value corresponds to the swarm size of the respective order. The retrieval of the data sets from the transportation vehicles is optimized in this way.

In the disclosed device for collecting transportation vehicle-based data, in particular, environmental data, and transferring it to a backend computer, wherein the device is configured and designed to carry out the method described above, the backend computer comprises:
an order management system for managing the orders,
a processing device for processing and classifying the incoming headers of the transportation vehicles of the swarm, and
a retrieval device with retrieval registers for retrieving the data sets associated with the headers which are classified as capable of being retrieved, from the transportation vehicles of the swarm.

The backend computer may also comprise
a transportation vehicle management system which communicates with the transportation vehicles and which retrieves the data sets associated with the headers from the transportation vehicles of the swarm, and
a data set management system for managing and processing the retrieved data sets.

The backend computer has an apparatus for temporarily storing headers which are currently not required and which can be used to fulfil the orders.

The benefits of the method explained above and of the corresponding device are attributable to the fact that within the order database, that is to say the order management system, there is a mechanism which permits regular monitoring of a location. For this purpose an order is produced to collect desired data sets of one or more data classes for a predefined trajectory in the required number of transportation vehicles. If correspondingly matching transportation vehicles are found, the data sets are thus collected here in the required number within the periodic time interval. Further matching data items which are not required are put back in a waiting list. If the orders are successfully processed by the transportation vehicles, they are detected as processed. If the orders are not processed within the defined time period, further data are requested from the waiting list by transportation vehicles. After of the expiry of the time period, the degree of fulfilment of orders is reset and new data from the transportation vehicles are requested for the next period.

This type of generation of orders matches ideally the demand for functions in the backend computer or later in the transportation vehicle. If, for example, it is requested that a navigation map have an update level of one day, which, for reasons of robustness, should be measured and ensured with, e.g., five swarm transportation vehicles, this can be carried out with the described method, since precisely these measurements can be extracted from the transportation vehicle swarm.

FIG. 1 shows a swarm 1, which is represented here as an individual transportation vehicle 2, wherein each transportation vehicle 2 of the swarm 1 moves along a route section (not illustrated) and collects, by using its environment sensor system 3, data relating to the transportation vehicle's environment while it travels along the route section, the data being collected in a data aggregator 4 of the transportation vehicle 2 and collated in a data aggregator 4 of the transportation vehicle 2 and stored temporarily with a time stamp and position information as well as an identification number of the transportation vehicle 2. The data aggregator 4 of the transportation vehicle 2 also has the object of producing an overview of the collected data of the route section being travelled on, the so-called header. In this context, the header comprises at least position information and time information on the route section being travelled on, as well as the type of collected environment data, that is to say which of the abovementioned data classes the collected data belongs to, and an identifier of the data-collecting vehicle, which is linked, for example, to the transportation vehicle identification number.

The headers which are generated by each transportation vehicle 2 of the swarm 1 and which relate to route sections which have been travelled on are fed in a wireless state, i.e., by a mobile radio, to a backend computer 10 which processes the supplied headers in a processing device 11. The processing of the headers in the processing device 11 is controlled by an order management system 12, which is present, for example, as an order database. In this context, the order management system 12 comprises a timer T as well as the current orders A1, A2 to An, wherein the timer T controls the time sequence of the orders A1 to An including possible chronological repetitions. The orders A1, A2 to An which are present in the order management system 12 relate to the processing of transportation vehicle-related data with respect to desired route sections at desired times.

Therefore, for example, the order A1 can relate to the traffic density on a predefined route section of a route between a starting position and an end position at a predefined time interval, for example, from 8.00 am to 9.00 am, wherein the order can be repeated periodically, that is to say, for example, from Monday to Friday, in each case with the specified time interval.

The orders A2 to An are structured in the same way and can relate to other route sections and other environment data, for example, the weather conditions along a predefined route section with a desired time interval. In addition, the size of the transportation vehicle swarm 1 is specified in each order, in other words there is a specification of how many transportation vehicles 2 are to supply transportation vehicle-related data with respect to the predefined route section within the specified time interval. The specification and definition of the orders A1 to An are produced by an external user 20 and transferred to the order management system 12 by the user 20. A detailed explanation of the order management system 12 is given below with reference to FIG. 2.

In the processing device 11 of the headers, a header which is input by a transportation vehicle 2 is checked on the basis of the order management system 12 to determine whether the header relates to data of a route section which is requested by one of the orders A1, A2, . . . , An present in the order management system 12. In addition, in the processing device 11 it is checked whether the header which is under consideration corresponds not only to the route section but also to the time intervals set by the orders A1, A2, . . . , An and to the desired environment data, that is to say the desired data type. If this is the case for a header received by a transportation vehicle 2 of the swarm 1, the header is classified as capable of being retrieved and is fed to a retrieval management system 14 which is responsible for managing the retrievals of the data set associated with a header from the corresponding transportation vehicle 2.

Headers which are currently not required can be buffered in a management and temporary storage apparatus 13, wherein headers which are currently not required are deleted after the expiry of a predefined holding time. The apparatus 13 is, as it were, a waiting area for headers.

The retrieval management system 14 creates, for all the headers for which there is an order A1 to An and whose complete data sets are to be retrieved from the transportation vehicles 2, retrieval registers R1, R2 to Rm which are referred to below for short, for the sake of better understanding, as retrievals whose more precise functionality is explained below with reference to FIGS. 3 and 4. The retrieval management system 14 instructs the transportation vehicle management system 15, on the basis of the retrievals R1, R2 to Rm, to request the corresponding transportation vehicles 2 to transfer the data sets associated with the respective headers which are capable of being retrieved. In addition, the retrieval management system 14 informs the order management system 12 about the initiated retrievals R1, R2, . . . , Rm, so that the order management system is aware of the current status of the individual orders A1, . . . , An.

To retrieve the data sets from the transportation vehicles 2, the communication apparatus 5 of the individual transportation vehicles 2 requests the transportation vehicle management system 15 to transfer data sets associated to the headers, on the basis of the transportation vehicle identifiers denoted in the retrievals R1 to Rm. For this purpose, the communication apparatus 5 of the transportation vehicle 2 extracts the corresponding complete data sets from the data aggregator 4 and transmits the data sets to the transportation vehicle management system 15.

The transportation vehicle management system 15 passes on the various data sets of the transportation vehicles 2 to a data set management system 16 which collects and formats the data sets. In addition, the data sets can be disguised in the data set management system 16 so that the origin of the data sets cannot be traced. The prepared data sets are then fed from the data set management system 16 to the order generator 20 for further processing and evaluation.

Figure 2:
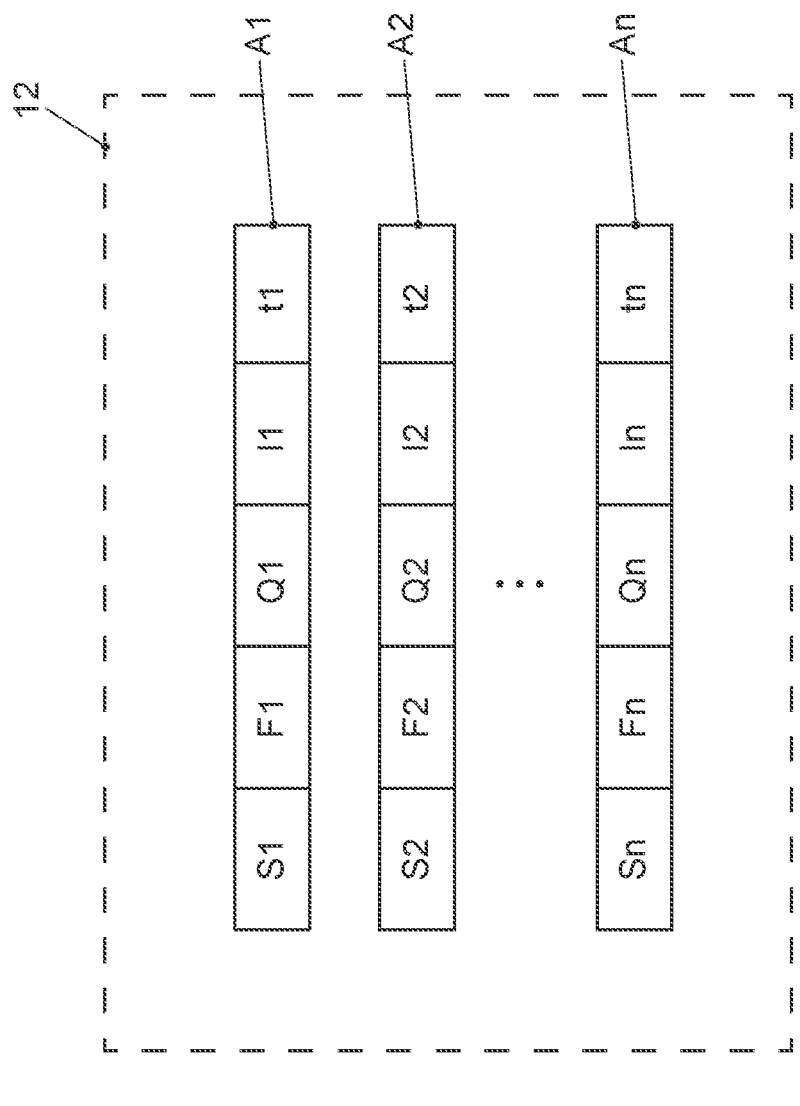
FIG. 2 shows the order management system in relatively large detail.

FIG. 2 shows the organization of the order management system 12 in detail. In the order management system 12, orders A1, A2 to An are created, wherein n signifies a natural number. In this context, each order $A_i$, $i \in \{1, \ldots, n\}$, n comprises a natural number, a prescribed set of parameters $S_i$, $F_i$, $Q_i$, $I_i$ and $t_i$, specifically at least the information as to the route section $S_i$ about which data is to be collected, in addition a setpoint number $F_i$ of data sets which indicates how many transportation vehicles per unit of time are to collect data for the route section, that is to say the swarm size per unit of time, the number $Q_i$ of data sets which have already been requested for the route section $S_i$, and the number of data sets $I_i$ which have already been received for the route section $S_i$, that is to say the actual state of the received data sets. In addition, the parameter of the time interval $t_i$ is present for the order $A_i$, which parameter predefines the time interval within which the order $A_i$ has to be processed. In this context, the parameter of the time interval $t_i$ can contain the information as to the frequency with which the orders are to be repeated. Further parameters which characterize the order $A_i$ can be contained in the parameter set. In other words, the enumeration of the parameters is not conclusive.

An exemplary parameter set of an order $A_1$ therefore contains the specification of the route section $S_1$ for which data is to be provided, the indication $F_1$ that data is to be collected from 10 transportation vehicles per second, the indication $Q_1$ that 5 data sets are already requested, and the indication $I_1$ that 2 data sets have already been received. In addition, the order $A_1$ also comprises the indication $t_1$ that the data sets are to be collected in the time interval from 8.00 am to 10.00 am and from Monday to Friday. The same applies to the parameters of the orders $A_2$ to $A_n$.

Figure 3:
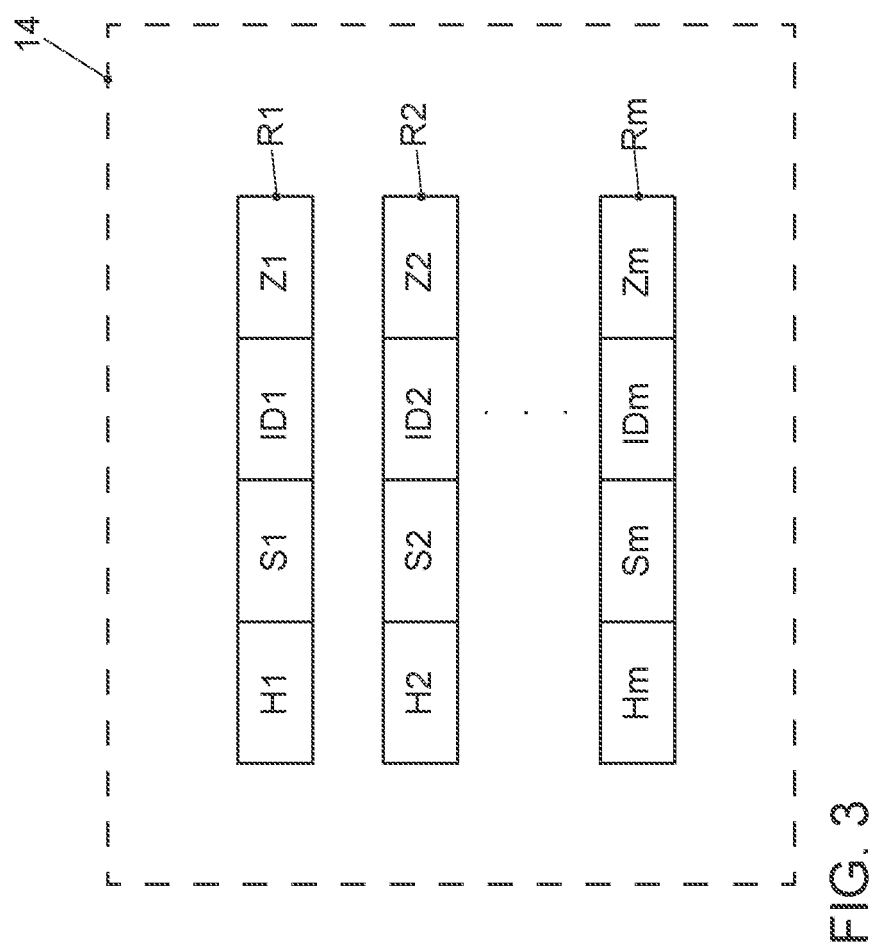
FIG. 3 shows the management of the data retrievals in a first embodiment.

FIG. 3 explains the method of functioning of the retrieval management system 14 in a first disclosed embodiment. Retrieval registers $R_1, R_2, \ldots, R_m$ are set up in the retrieval management system 14, m being a natural number and each retrieval register $R_i$, $i \in 1, \ldots, m$ comprising at least the following parameters:

a header $H_i$ which characterizes a data set to be retrieved from a transportation vehicle 2, the route section $S_i$ which is associated with the header $H_i$, an interrogation identification method or mechanism $ID_i$ for identifying the interrogation $A_i$ with the order $A_i$ and a state parameter $Z_i$ which characterizes the current state of the retrieval register $R_i$. In this way, the state parameter $Z_i$ can already be occupied with three values, for example, wherein the first value indicates that an interrogation has not yet taken place, the second value indicates that the interrogation has been passed on, and the third value indicates that the corresponding data set has arrived from the transportation vehicle, so that the retrieval register $R_i$ can be deleted.

In this way, retrieval can be processed on the basis of the retrieval registers $R_1, R_2, \ldots, R_m$ in the retrieval management system 14, and single retrievals $R_1, R_2, \ldots, R_m$, or a plurality thereof simultaneously, can subsequently be executed to receive the respective data sets. The retrievals $R_i$ are usually executed sequentially, in other words if a header is assessed as being suitable and capable of being used on the basis of a current order $A_i$ of the order management system 12 by the processing device 11, the associated data set is executed by the retrieval management system by using a retrieval $R_i$.

Figure 4:
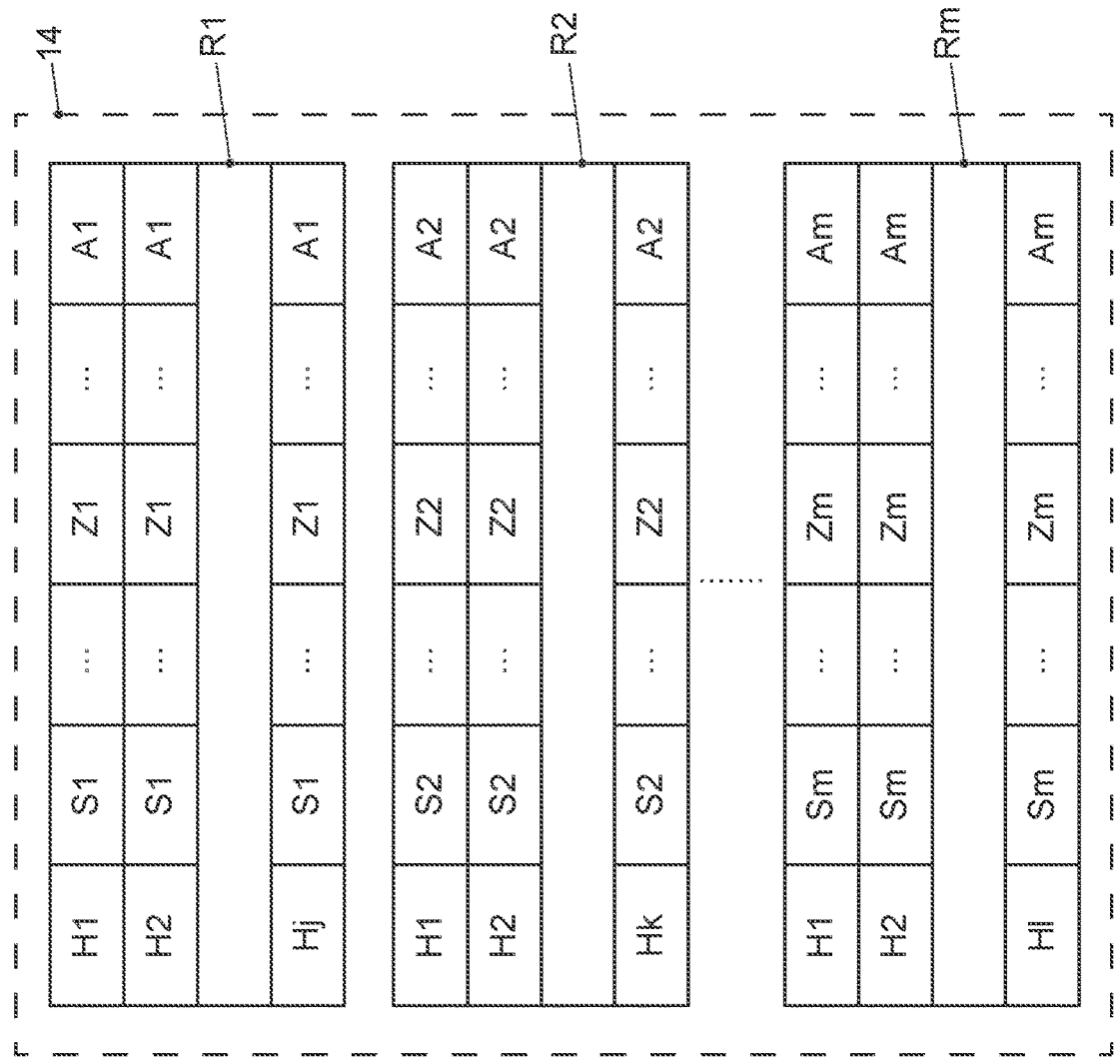
FIG. 4 shows the management of the data retrievals in a second embodiment.

FIG. 4 explains the function of the retrieval management system 14 in a second disclosed embodiment in which the inputting of a header, assessed as being suitable, into the retrieval management system 14 does not immediately lead to retrieval of the corresponding data set. In the second disclosed embodiment, the headers which are input into the orders $A_i$ are collected in the retrieval management system 14 until a predefined number of headers, or all the headers required to carry out the order $A_i$, have arrived for each order $A_i$, so that a block of headers arrives simultaneously for retrieval, which saves transmission bandwidth.

The retrieval registers $R_1, R_2, \ldots, R_m$ therefore each comprise in the second disclosed embodiment a plurality of parameter sets which are represented by way of example in FIG. 4, wherein other configurations of the individual retrieval registers $R_i$, $i \in \{1, \ldots, m\}$, where m is a natural number, are possible.

The configuration is explained below with reference to the example of the retrieval registers $R_1$, $R_2$ and $R_m$, wherein in the example m=n, in other words the number m of retrieval registers $R_1$ to $R_m$ corresponds to the number n of orders $A_1$ to $A_n$.

The parameter set for the retrieval register $R_1$ is composed in the second disclosed embodiment of the headers $H_1$ to $H_j$, wherein j is the number of data sets required for the order $A_1$. In addition associated with each header $H_1$ to $H_j$ are the relevant route section $S_1$, a state variable $Z_1$, as described in conjunction with the first disclosed embodiment, as well as an identification parameter which is represented here directly by the order parameter $A_1$ for the sake of simplicity.

In the same way, the retrieval register $R_2$ comprises the headers $H_1$ to $H_k$, where k is the number of data sets required for the order $A_1$. In addition, the route section parameter $S_2$, the state parameter $Z_2$ and the order parameter $A_2$ are also necessary.

The retrieval register $R_m$ relates to the headers $H_1$ to $H_l$, where l is the number of data sets required for the order $A_m$. In addition, the route section parameter $S_m$, the state parameter $Z_m$ and the order parameter $A_m$ are also necessary, wherein in this example n=m. It is also possible that the index m does not correspond to the order number n, for example, if, owing to the preselected time intervals, orders $A_i$ have been specified in the order management system but are not available for execution in the current time interval.

In addition, further parameters which are indicated by blank spaces in FIG. 4 can also be used in the specified parameter sets.

LIST OF REFERENCE SYMBOLS

1 Swarm
2 Transportation vehicle
3 Environment sensor system for transportation vehicle
4 Data aggregator for transportation vehicle
5 Communication apparatus for transportation vehicle
10 Backend computer
11 Processing of incoming headers
12 Order management system (database)
T Timer
A1 Order 1
A2 Order 2
An Order n
13 Management/storage of headers which are currently not required
14 Management of retrievals of data sets/requesters
R1 Retrieval register 1
R2 Retrieval register 2
Rm Retrieval register m
15 Transportation vehicle management system/data request system
16 Data set management system for retrieved data sets 20 User/order generator
S1 Road segment 1
S2 Road segment
Sn Road segment
F1 Setpoint number of data sets as number of transportation vehicles per unit of time for segment S1
F2 Setpoint number of data sets as number of transportation vehicles per unit of time for segment S2
Fn Setpoint number of data sets as number of transportation vehicles per unit of time for segment Sn
Q1 Requested data sets for segment S1
Q2 Requested data sets for segment S2
Qn Requested data sets for segment Sn
I1 Retrieved data sets for segment S1
I2 Retrieved data sets for segment S2
In Retrieved data sets for segment Sn
t1 Time interval for order A1
t2 Time interval for order A2
tn Time interval for order An
H1 Header 1
H2 Header 2
Hj Header j
Hk Header k
Hl Header l
Hm Header m
S1 Route 1
S2 Route 2
Sm Route m
ID1 Order identifier
ID2 Order identifier
IDm Order identifier
Z1 State identifier
Z2 State identifier
Zm State identifier

The invention claimed is:

1. A system comprising:
equipment provided on a transportation vehicle and configured for collecting transportation vehicle-based data; and
a backend computer,
wherein the transportation vehicle equipment is configured to transfer the data to the backend computer, wherein the data comprise data sets related to predefined route sections travelled by a swarm of data-collecting transportation vehicles including the transportation vehicle,
wherein the backend computer is configured to store parameterized orders for acquisition of transportation vehicle-based data,
wherein each parameterized order comprises at least, as parameters:
a route section defined with a specified route section for which transportation vehicle-related data is to be collected,
a swarm size defined with how many transportation vehicles per unit of time are to collect data for the specified route section, and
a time interval defined with a time interval in which data is acquired for the route section,
wherein route-related data is transferred to the backend computer from each transportation vehicle of the swarm as a header that includes an overview of the transportation vehicle-based data stored temporarily in the respective transportation vehicle,
wherein the backend computer includes a processor configured to compare a transferred header to requirements of orders defined by the parameters and to classify, in response to a positive comparison, the transferred header as capable of being retrieved,
an order management system for managing the orders,
a transportation vehicle management system which communicates with the transportation vehicles and which retrieves the data sets associated with the headers which are classified for retrieval from the transportation vehicles of the swarm in response to the number of headers reaching a predefined value, wherein the predefined value corresponds to the swarm size of the respective order, and
a data set management system for managing and processing the retrieved data sets.

2. The system of claim 1, wherein the backend computer further comprises an apparatus for temporarily storing headers which are not currently required.

3. A method for collecting transportation vehicle-based data and transferring the data to a backend computer, wherein the respective data sets relate to predefined route sections travelled along by a swarm of data-collecting transportation vehicles, the method comprising:
storing parameterized orders for acquisition of transportation vehicle-based data is stored in the backend computer, wherein each order comprises at least, as parameters:
a route section defined with a specified route section for which transportation vehicle-related data is collected,
a swarm size defined with how many transportation vehicles per unit of time are to collect data for the specified route section, and
a time interval defined with a time interval in which data is acquired for the route section;
transferring route-related data to the backend computer from each transportation vehicle of the swarm as a header that includes an overview of the transportation vehicle-based data stored temporarily in the respective transportation vehicle,
comparing, by a processor of the backend computer, a transferred header with requirements of the orders defined by the parameters,
classifying, in response to a positive comparison, the transferred header as capable of being retrieved,
retrieving the data set assigned to the header classified for retrieval from the transportation vehicle responsive to the number of headers reaching a predefined value, wherein the predefined value corresponds to the swarm size of the respective order, and
transmitting the retrieved data set for further processing.

4. The method of claim 3, wherein headers not currently required are stored for a predefined time period.

5. The method of claim 4, wherein headers not currently required are compared with the defined requirements of the orders within the predefined time period.

6. The method of claim 3, wherein the parameter of the time interval of each order is additionally assigned a repetition frequency with which the order is repeated.

7. The method of claim 3, wherein each order comprises:
already requested data sets, and
already received data sets.

8. The method of claim 7, wherein, in response to retrieval of a header, the requesting of the retrieval is noted in the parameter of already requested data sets, and, in response to reception of the requested data set, the reception is noted in the parameter of already received data sets.

9. The method of claim 3, wherein each header capable of being retrieved is stored together with further parameters in a retrieval register, by which the data set associated with the header from the respective transportation vehicle is retrieved.

10. The method of claim 9, wherein each header capable of being retrieved is respectively assigned a retrieval register by which the associated data set is retrieved from the transportation vehicle.

11. The method of claim 9, wherein each header capable of being retrieved is respectively assigned a retrieval register, wherein each retrieval register is assigned an order, and a retrieval register has more than one header.

12. The method of claim 11, wherein the data sets assigned to the headers of a retrieval register are retrieved from the corresponding transportation vehicles when the number of headers of a retrieval register reaches the predefined value.

\* \* \* \* \*

UNITED STATES PATENT AND TRADEMARK OFFICE
CERTIFICATE OF CORRECTION

| | | |
|---|---|---|
| PATENT NO. | : 12,000,709 B2 | Page 1 of 1 |
| APPLICATION NO. | : 16/809937 | |
| DATED | : June 4, 2024 | |
| INVENTOR(S) | : Stephan Max | |

It is certified that error appears in the above-identified patent and that said Letters Patent is hereby corrected as shown below:

On the Title Page

Item (73) Assignee, Please change "VOLKSWAGEN AKTIENGESELLSCHAFT (DE)" to
-- VOLKSWAGEN AKTIENGESELLSCHAFT (DE); AUDI AG (DE) --.

Signed and Sealed this
Twenty-fifth Day of February, 2025

Coke Morgan Stewart
*Acting Director of the United States Patent and Trademark Office*